(12) United States Patent
Fujiu (10) Patent No.: US 6,914,507 B2
(45) Date of Patent: Jul. 5, 2005

(54) YOKE OF AN ELECTROMAGNETIC CLUTCH

(75) Inventor: Hideaki Fujiu, Isesaki (JP)

(73) Assignee: Sanden Corporation, Gunma (JP)

( * ) Notice: Subject to any disclaimer, the term of this patent is extended or adjusted under 35 U.S.C. 154(b) by 29 days.

(21) Appl. No.: 10/170,639

(22) Filed: Jun. 14, 2002

(65) Prior Publication Data

US 2003/0043008 A1 Mar. 6, 2003

(30) Foreign Application Priority Data

Sep. 3, 2001 (JP) .................................. P2001-266010

(51) Int. Cl.$^7$ ............................................. H01F 27/29
(52) U.S. Cl. ...................... 336/192; 439/387; 439/402
(58) Field of Search ................. 439/378, 401, 439/402, 404, 418, 427, 387; 336/192, 198; 335/289–291

(56) References Cited

U.S. PATENT DOCUMENTS

| | | | |
|---|---|---|---|
| 4,181,393 A | 1/1980 | Lill | |
| 4,419,536 A | 12/1983 | Doyle et al. | |
| 4,429,358 A | 1/1984 | Miyagi | |
| 4,557,544 A | 12/1985 | Esser | |
| 4,623,754 A | 11/1986 | Kikuchi et al. | |
| 4,778,407 A | 10/1988 | Myers | |
| 4,935,713 A | 6/1990 | Bekheet | |
| 5,138,293 A | 8/1992 | Ishimaru | |
| 5,225,801 A | 7/1993 | Ida et al. | |
| 5,307,038 A * | 4/1994 | Ishimaru | 335/296 |
| 5,320,206 A | 6/1994 | Maejima | |
| 5,358,423 A * | 10/1994 | Burkhard et al. | 439/402 |
| 5,508,671 A | 4/1996 | Takashi | |
| 5,812,044 A * | 9/1998 | Sakamoto | 335/299 |
| 5,889,455 A | 3/1999 | Sakamoto | |
| 6,065,993 A * | 5/2000 | Lai et al. | 439/402 |
| 6,069,547 A | 5/2000 | Sakamoto | |
| 6,091,590 A | 7/2000 | Sakamoto | |
| 6,142,817 A | 11/2000 | Lee | |
| 6,413,116 B2 * | 7/2002 | Bechaz et al. | 439/406 |
| 6,512,440 B2 | 1/2003 | Suda | |
| 2002/0050901 A1 | 5/2002 | Suda | |

FOREIGN PATENT DOCUMENTS

| | | |
|---|---|---|
| DE | 1263130 | 3/1968 |
| DE | 3024894 | 1/1982 |
| DE | 19640261 | 4/1998 |
| EP | 0806583 | 11/1997 |
| EP | 0859430 | 8/1998 |
| GB | 2248969 | 4/1992 |
| JP | 08247171 | 9/1996 |
| WO | 9900873 | 1/1999 |

OTHER PUBLICATIONS

French Search Report, Dated Oct. 13, 2004.

* cited by examiner

Primary Examiner—Lincoln Donovan
(74) Attorney, Agent, or Firm—Baker Botts L.L.P.

(57) ABSTRACT

A yoke of an electromagnetic clutch includes a ring case, a coil assembly, a connector, and at least one contact. The ring case includes an annular groove and an opening. The coil assembly is positioned in the annular groove. The connector is positioned in the opening of the ring-case and includes a first groove to receive an end portion of the coil assembly, a second groove to receive a lead wire of a diode, and a third groove to receive an end portion of an external wire. The at least one contact includes three pairs of slits and may be inserted in the connector so that each of the three pairs of slits is aligned with a respective one of the first groove, the second groove, and the third groove to form an electrical connection between the end portion of the coil assembly, the lead wire of the diode, and the end portion of the external wire.

18 Claims, 9 Drawing Sheets

YOKE OF AN ELECTROMAGNETIC CLUTCH

BACKGROUND OF THE INVENTION

1. Field of the Invention

The present invention relates to a connector of an electromagnetic clutch. More particularly, the present invention relates to an electrical connector of a yoke of an electromagnetic clutch.

2. Description of Related Art

Figure 1:
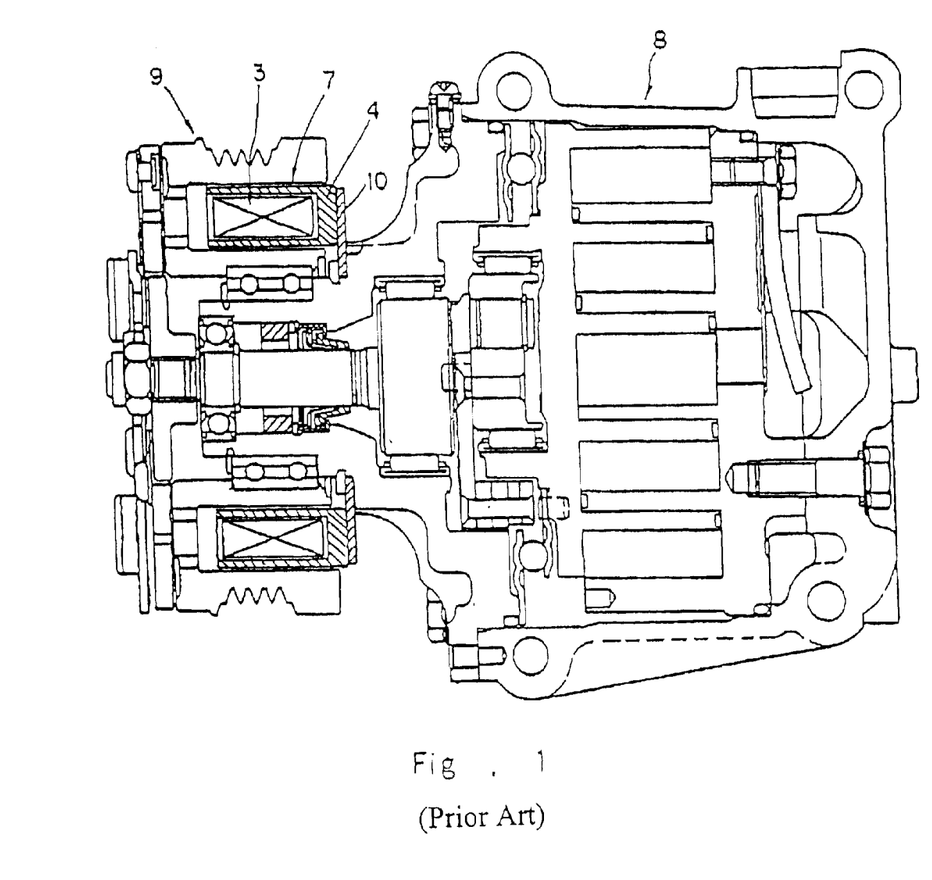
FIG. 1 is a longitudinal cross-sectional view of a known compressor that includes an electromagnetic clutch.

In FIG. 1, a compressor 8 of a vehicle air conditioner is shown. Compressor 8 may include an electromagnetic clutch 9. Electromagnetic clutch 9 may selectively connect and disconnect a drive source to a drive shaft of compressor 8.

Electromagnetic clutch 9 may include a yoke 7. Yoke 7 comprises an annular-shaped ring case 4, a coil assembly 3, and a connector (not shown). Coil assembly 3 is positioned in an annular groove of ring case 4. A bottom portion of ring case 4 is fixed to a housing of compressor 8, via a plate 10.

Figure 2:
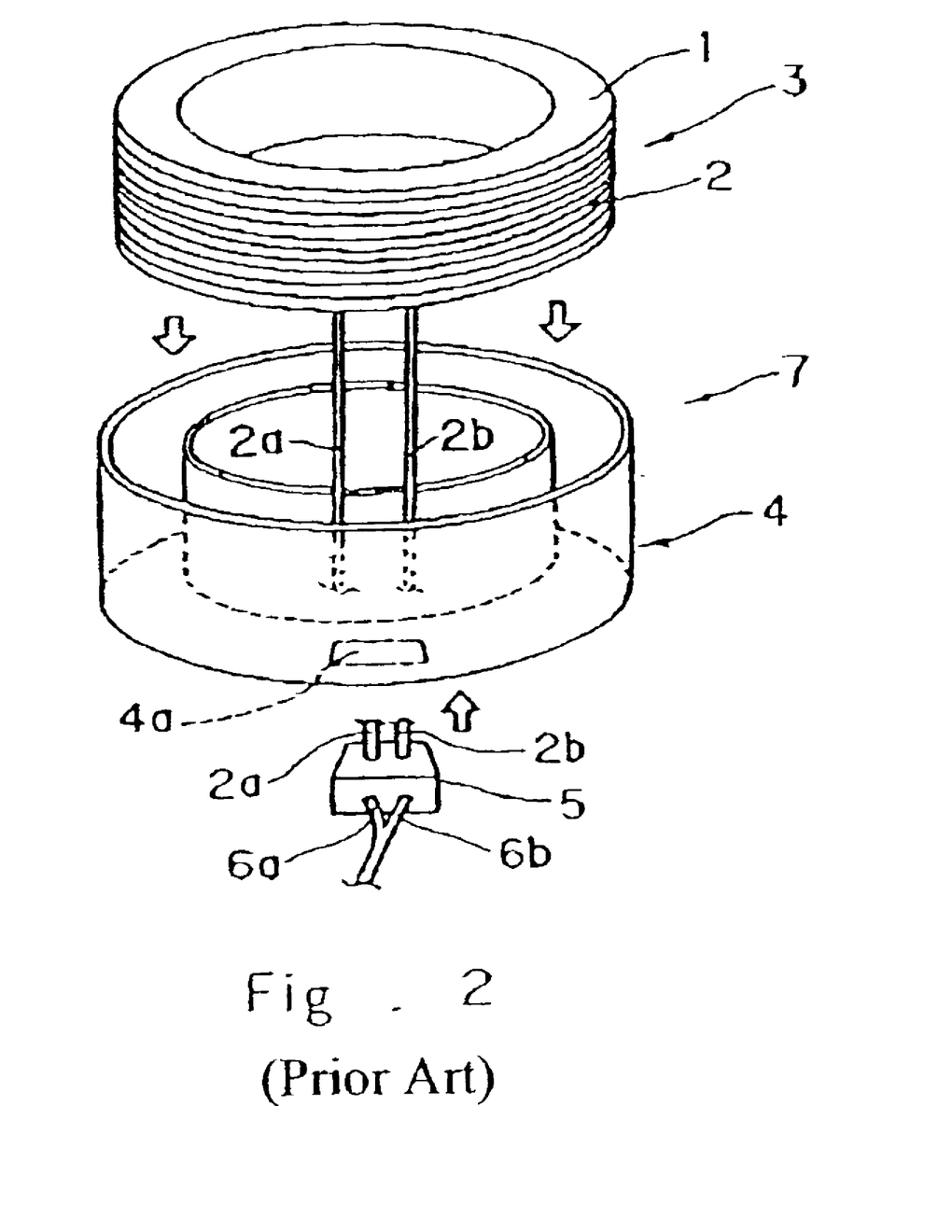
FIG. 2 is an exploded perspective view of a yoke of an electromagnetic clutch.

As shown in FIG. 2, coil assembly 3 comprises a coil bobbin 1 and a coil 2 wound around coil bobbin 1. Coil 2 has end portions 2a, 2b. A substantially rectangular-shaped opening 4a is formed through a bottom portion of ring case 4. Coil assembly 3 may be positioned within annular groove of ring case 4, so that end portions 2a, 2b of coil 2 pass through opening 4a. After passing through opening 4a, end portions 2a, 2b of coil 2 may be positioned in a connector 5. Within connector 5, each of end portions 2a, 2b of coil 2 may be connected electrically with a respective one of a pair of external wires 6a, 6b. Connector 5 may be secured to ring case 4, so that a portion of connector 5 fits into opening 4a of ring case 4.

Figure 3:
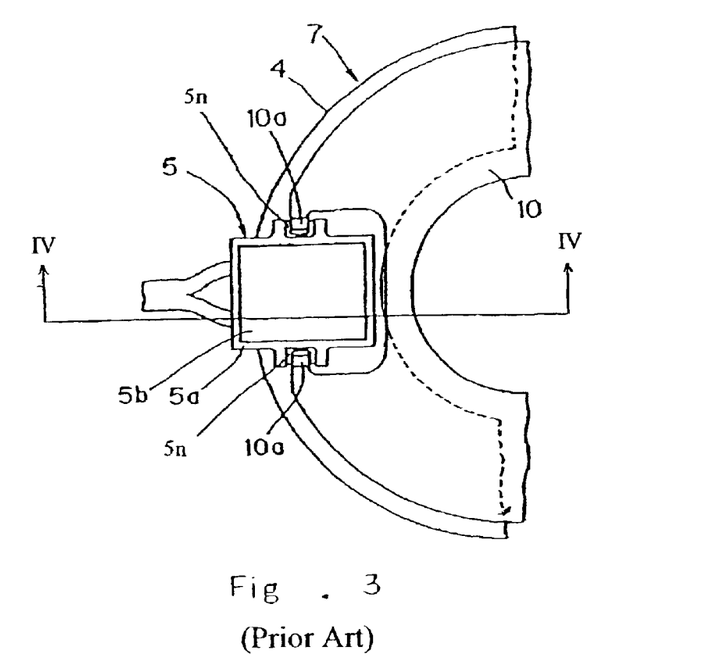
FIG. 3 is a partial bottom view of the yoke of FIG. 2.

With reference to FIG. 3, connector 5 comprises a case 5a and a cap 5b. By caulking nail portions 10a of plate 10 into nail receiving portions 5n of case 5a, case 5a may be fixed to the bottom portion of ring case 4. Cap 5b may include hooks (not shown). Case 5a may include hook-receiving portions (not shown). When the hooks of cap 5b engage the hook-receiving portions of case 5a, cap 5b may be secured to case 5a.

Figure 4:
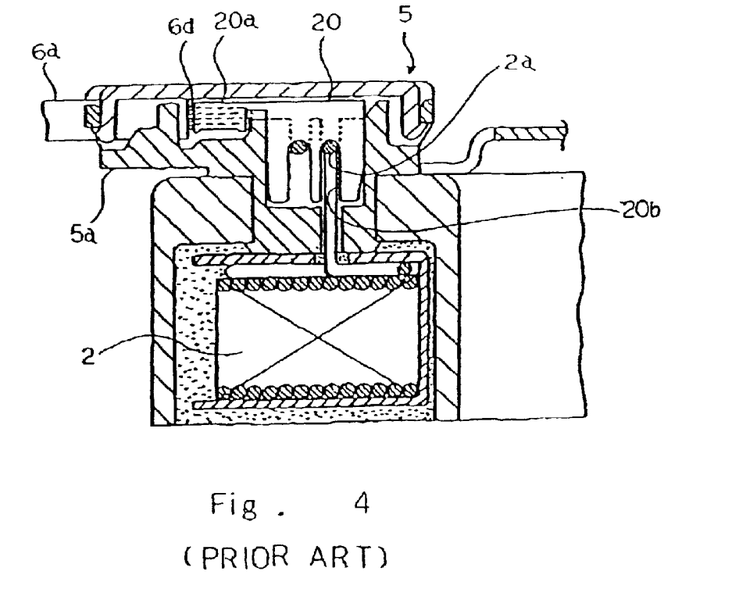
FIG. 4 is a cross-sectional view taken along line IV—IV of FIG. 3.

FIG. 4 shows a known electrical terminal for connecting each external wire 6a, 6b to respective end portions 2a, 2b of coil 2 in connector 5. Each external wire 6a, 6b may be connected electrically to a respective end portion 2a, 2b of coil 2, via a contact 20. To connect each external wire 6a, 6b to a respective contact 20, a portion of the insulation of each external wire 6a, 6b must be removed to expose a core wire 6d of each external wire 6a, 6b. After passing core wire 6d of each external wire 6a, 6b through an electrical connection portion 20a of each contact 20, electrical connection portion 20a of each contact 20 may be crimped or the like, around core wire 6d of each external wire 6a, 6b, so that each external wire 6a, 6b may be connected electrically to a respective contact 20. Each contact 20 may include a slit 20b into which a respective end portion 2a, 2b of coil 2 may be inserted, e.g., pressed or the like. When each end portion 2a, 2b of coil 2 is inserted into slit 20b of a respective contact 20, each end portion 2a, 2b of coil 2 is positioned in a direction that is substantially perpendicular to external wires 6a, 6b. By pressing each end portion 2a, 2b of coil 2 into slit 20b of a respective contact 20, each contact 20 may be connected electrically with a respective end portion 2a, 2b of coil 2. In this way, each external wire 6a, 6b may be connected electrically with a respective end portion 2a, 2b of coil 2, via a contact 20.

Thus, formation of an electrical connection between external wires 6a, 6b and respective end portions 2a, 2b of coil 2 in electromagnetic clutches of known compressors may include the step of removing insulation from an end portion of each external wire 6a, 6b to expose core wire 6d. Exposed core wire 6d of each external wire 6a, 6b may be inserted into a respective electrical connection portion 20a of each contact 20, and electrical connection portion 20a may be crimped around core wire 6d of each external wire 6a, 6b. Each contact 20 may be inserted into case 5a, so that each end portion 2a, 2b of coil 2 is inserted into a slit 20b of each respective contact 20. Thus, this known method of connecting the external wires to the end portions of the coil may include multiple steps, each of which steps increases the time and cost of manufacturing the connector.

SUMMARY OF THE INVENTION

A need has arisen for an improved connector for establishing an electrical connection between external wires and end portions of the coil of an electromagnetic clutch. In particular, a need has arisen for an electrical connector that may be positioned in a yoke of an electromagnetic clutch to electrically connect external wires, end portions of the coil, and other wires, e.g., lead wires of a diode or the like.

A further need has arisen for a connector that establishes and maintains a secure electrical connection between the external wires and the end portions of the coil. A still further need has arisen for a connector that increases the electrical contact between the core wire of the external wires and a contact of the connector to strengthen and maintain a secure electrical connection.

Another need has arisen for a connector that securely retains a core wire of an external wire within a contact, e.g., that retains a core wire in a slit of a contact after the core wire is inserted into the slit. Still another need has arisen for a contact with a slit into which an external wire readily may be inserted, which may cut through insulation of an external wire, and which may retain a core wire of the external wire after the core wire is inserted into the slit, e.g., by narrowing in width.

In an embodiment of the present invention, a yoke of an electromagnetic clutch comprises a ring case, a coil assembly, a connector, and at least one contact. The ring case comprises an annular groove and an opening. The coil assembly is positioned in the annular groove of the ring case. The connector is positioned in an opening of the ring case and comprises a first groove adapted to receive an end portion of the coil assembly, a second groove adapted to receive a lead wire of a diode, and a third groove adapted to receive an end portion of an external wire. The at least one contact comprises three pairs of slits and may be inserted in the connector so that each of the three pairs of slits is aligned with a respective one of the first groove, the second groove, and the third groove, so that the at least one contact forms an electrical connection between the end portion of the coil assembly, the lead wire of the diode, and the end portion of the external wire.

In a further embodiment of the present invention, a method of connecting a plurality of wires in a connector case of a yoke of an electromagnetic clutch, wherein the connector case comprises a first groove, a second groove, and a third groove, comprises the steps of positioning a first wire in the first groove, positioning a second wire in the second groove, positioning a third wire in the third groove, positioning a contact in the connector case in alignment with each of the first, second, and third wires, and inserting the contact into the connector case, so that the contact engages the first, second, and third wires.

Other objects, features, and advantages of embodiments of this invention will be apparent to persons of ordinary skill in the art from the following detailed description of the invention and the accompanying drawings.

BRIEF DESCRIPTION OF THE DRAWINGS

The present invention may be understood more readily with reference to the following drawings.

DETAILED DESCRIPTION OF PREFERRED EMBODIMENTS

Figure 5A:
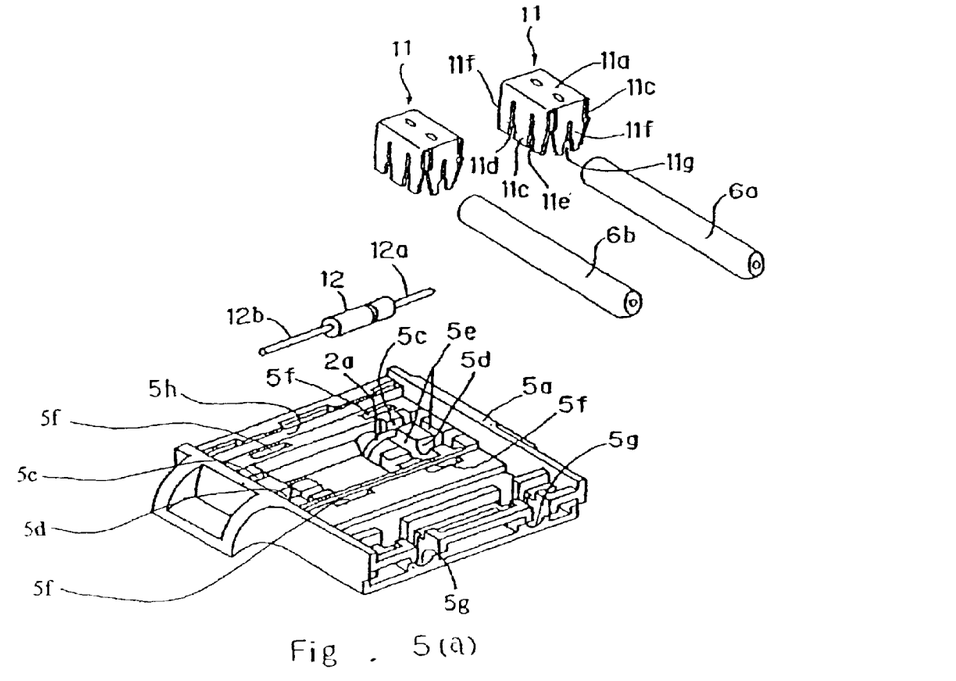
FIG. 5(a) is an exploded perspective view of external wires and a connector according to an embodiment of the present invention.

FIG. 5(a) shows a connector for establishing an electrical connection between external wires 6a, 6b and end portions 2a, 2b of a coil 2, according to the present invention. The connector may further be used for connecting lead wires 12a, 12b of a diode 12 to external wires 6a, 6b and end portions 2a, 2b of coil 2. The connector may include a pair of contacts 11 and a connector case 5a.

Each contact 11 may be substantially parallelepiped-shaped and include a substantially rectangular-shaped upper plate 11a, a pair of first side plates 11f, and a pair of second side plates 11c. The pair of first side plates 11f may extend respectively from a first pair of opposing sides of upper plate 11a. The pair of second side plates 11c may extend respectively from a second pair of opposing sides of upper plate 11a. Each of first side plates 11f may include a slit 11g, which may be formed at a lower edge of each first side plate 11f and extend from the lower edge of each first side plate 11f toward upper plate 11a. Each of second side plates 11c may include a pair of slits 11d, 11e, each of which slits 11d, 11e may be formed at a lower edge of each second side plate 11c and extend from the lower edge of each second side plate 11c toward upper plate 11a.

Grooves for external wires 6a, 6b, e.g., curved notches 5g, may be formed in connector case 5a to receive external wires 6a, 6b. A pair of lead wire grooves 5d may be formed in connector case 5a to receive lead wires 12a, 12b of diode 12. Lead wire grooves 5d may extend inwardly from an outer wall of connector case 5a in a direction that is substantially perpendicular to a longitudinal axis of the outer wall and to an axis of external wires 6a, 6b when external wires 6a, 6b are positioned in notches 5g of connector case 5a. A pair of coil grooves 5c may be formed in connector case 5a to receive end portions 2a, 2b of coil 2. Coil grooves 5c may extend inwardly from an outer wall of connector case 5a in a direction that is substantially parallel to lead wire grooves 5d. Two pairs of first grooves 5f may be formed in connector case 5a to receive first side plates 11f of each contact 11. Two pair of second grooves 5e may be formed in connector case 5a to receive second side plates 11c of each contact 11.

To assemble the connector according to an embodiment of the present invention, each end portion 2a, 2b of coil 2 may be placed in a respective coil groove 5c of connector case 5a. Each lead wire 12a, 12b of diode 12 may be placed in a respective lead wire groove 5d of connector case 5a. Each external wire 6a, 6b may be positioned in a respective external wire notch 5g and extend through connector case 5a, so that an end portion of each external wire 6a, 6b may touch a wall 5h of connector case 5a. Wall 5h may be positioned on a side of connector case 5a that is furthest removed from a side of connector case 5a in which external wire notches 5g are formed. External wires 6a, 6b may extend in a direction that is substantially perpendicular to an axis of lead wire grooves 5d, and thus to each of lead wires 12a, 12b when lead wires 12a, 12b are positioned in lead wire grooves 5d.

To electrically connect end portion 2a of coil 2, lead wire 12a of diode 12, and external wire 6a, one contact 11 of the pair of contacts 11 may be positioned in connector case 5a, so that slit 11g is aligned with external wire groove 5g and end portion of external wire 6a, Slit 11e is aligned with lead wire groove 5d and lead wire 12a of diode 12. Slit 11d is aligned with coil groove 5c and end portion 2a of coil 2. When upper plate 11a of contact 11 is inserted into connector case 5a, first side plates 11f may be inserted into first grooves 5f, and second side plates 11c may be inserted into second grooves 5e. Moreover, slit 11g engages external wire 6a, slit 11e engages lead wire 12a of diode 12, and slit 11d engages end portion 2a of coil 2, such that an electrical connection may be formed between external wire 6a, lead wire 12a of diode 12, and end portion 2a of coil 2.

Figure 5B:
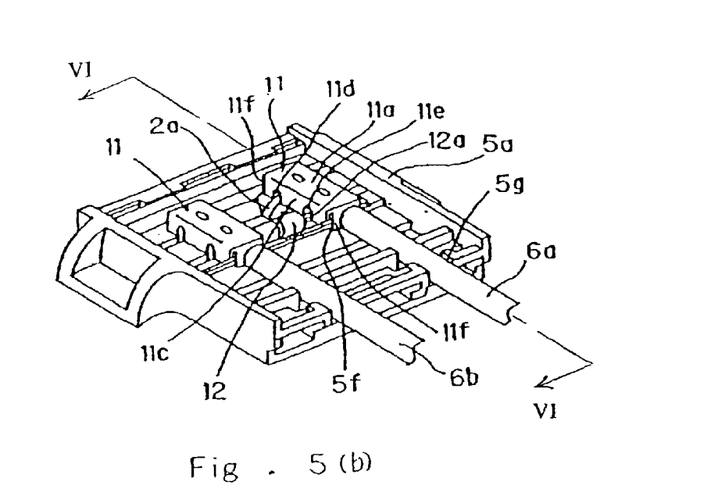
FIG. 5(b) is a perspective view of an assembled connector according to an embodiment of the present invention.

To electrically connect end portion 2b of coil 2, lead wire 12b of diode 12, and external wire 6b, a second contact 11 of the pair of contacts 11 may be positioned in connector case 5a, so that slit 11g is aligned with second external wire groove 5g and end portion of external wire 6b. Slit 11e is aligned with second lead wire groove 5d and lead wire 12b of diode 12. Slit 11d is aligned with second coil groove 5c and end portion 2b of coil 2. When upper plate 11 a of contact 11 is inserted into connector case 5a, first side plates 11*f* of contact 11 may be inserted into first grooves 5*f*, and second side plates 11*c* of contact 11 may be inserted into second grooves 5*e*. Moreover, slit 11*g* engages external wire 6*b*, slit 11*e* engages lead wire 12*b* of diode 12, and slit 11*d* engages end portion 2*b* of coil 2, such that an electrical connection may be formed between external wire 6*b*, lead wire 12*b* of diode 12, and end portion 2*b* of coil 2. Thus, an electrical connection may be established between external wires 6*a*, 6*b*, end portions 2*a*, 2*b* of coil 2, and lead wires 12*a*, 12*b* of diode 12, via a pair of contacts 11 and connector case 5*a*, as shown in FIG. 5(*b*).

Figure 6:
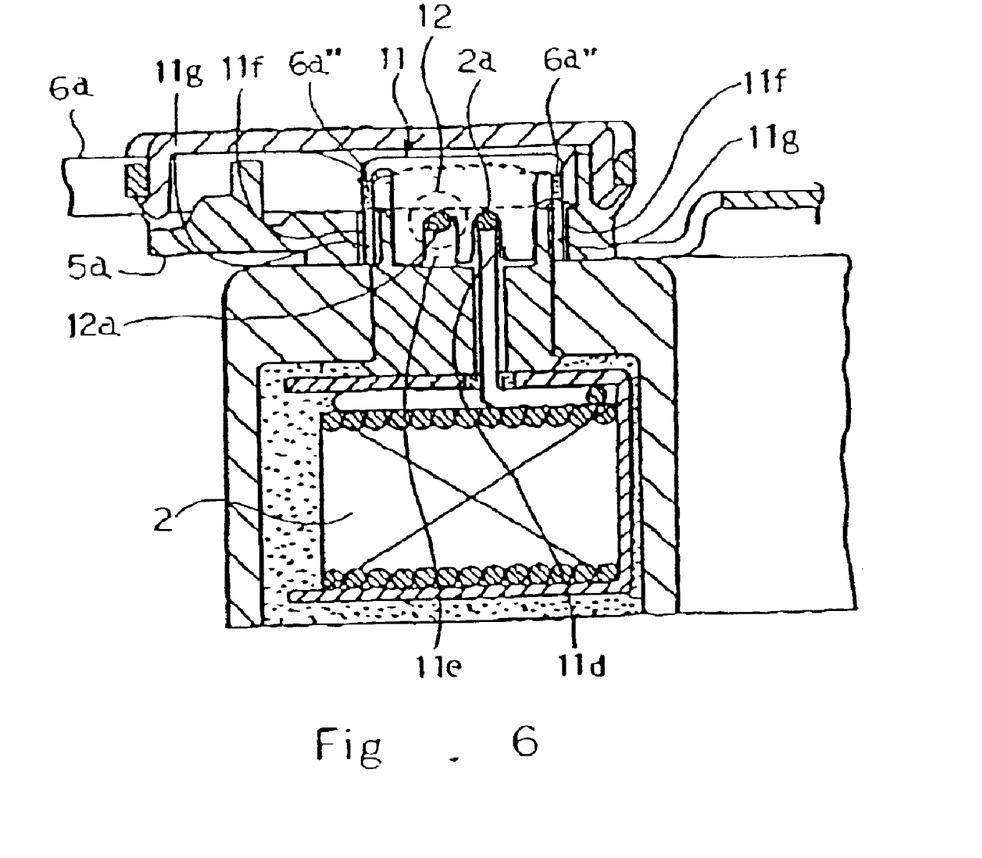
FIG. 6 is a cross-sectional view taken along line VI—VI in FIG. 5(b).

As shown in FIG. 6, an electrical connection may be formed between end portion 2*a* of coil 2 and contact 11, via engagement of end portion 2*a* with slit 11*d* of contact 11. Moreover, an electrical connection may be formed between lead wire 12*a* of diode 12 and contact 11, via engagement of lead wire 12*a* with slit 11*e* of contact 11.

Further, an electrical connection may be formed between end portion of external wire 6*a* and contact 11, via engagement of core wire 6*a*" of external wire 6*a* with slit 11*g* of each first side plate 11*f* of contact 11. This connection may be formed when contact 11 is inserted into connector case 5*a*, e.g., when first side plates 11*f* are inserted into first grooves 5*f*, and second side plates 11*c* are inserted into second grooves 5*e*. As contact 11 is inserted into connector case 5*a*, the edges of slit 11*g* cut through insulation of external wire 6*a* to engage a portion of core wire 6*a*" of external wire 6*a*. In this way, an electrical connection may be formed between external wire 6*a* and contact 11. An electrical connection may be formed in a similar manner between end portion of external wire 6*b* and a second contact 11.

Figure 7:
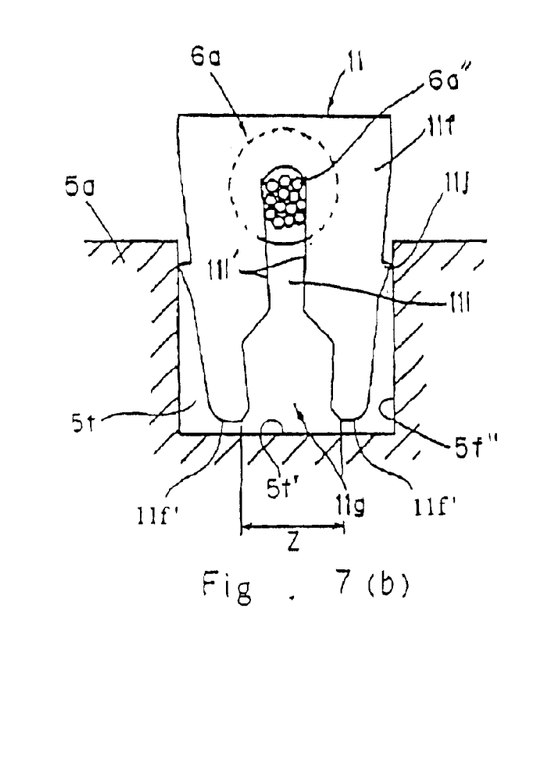
FIG. 7(a) is a side elevational view of a contact according to the present invention and a cross-sectional view of an external wire before insertion.
FIG. 7(b) is a side elevational view of a contact according to the present invention and a cross-sectional view of an external wire after insertion.

FIG. 7(*a*) shows the shape of slit 11*g* of first side plates 11*f* of contact 11 according to an embodiment of the invention. Moreover, slits 11*d*, 11*e* of second side plates 11*c* may have a shape similar to that of slit 11*g*. Slit 11*g* may include a wide portion 11*h* and a narrow portion 11*i*. A tapered portion 11*h*' may connect wide portion 11*h* and narrow portion 11*i*. In a preferred embodiment of the invention, a depth L1 and a width W of wide portion 11*h* may be greater than an outer diameter D of external wire 6*a*, so that external wire 6*a* may be held securely within wide portion 11*h* before contact 11 is inserted into case 5*a*. Thus, contact 11 may include slits 11*g* of varying dimension.

Narrow portion 11*i* of contact 11 includes two lateral edges 11*i*' and an end edge portion 11*i*'". In a preferred embodiment of the invention, the distance between lateral edges 11*i*', i.e., the width w of narrow portion 11*i*, may be less than a diameter d of core wire 6*a*" of external wire 6*a*, so that core wire 6*a*" of external wire 6*a* may be held securely in narrow portion 11*i* in contact, e.g., in electrical contact, with lateral edges 11*i*' of slit 11*g* when contact 11 is inserted into case 5*a* and first side plate 11*f* enters first groove 5*f*, as shown in FIG. 7(*b*). Referring again to FIG. 7(*a*), in a preferred embodiment of the invention, a depth L2 of narrow portion 11*i* may be larger than outer diameter D of external wire 6*a*, so that external wire 6*a* may move along enough of a length of slit 11*g* to securely establish an electrical contact between core wire 6*a*" and each lateral edge 11*i*' of slit 11*g* of first side plate 11*f*. When each first side plate 11*f* of contact 11 is pushed into a respective first groove 5*f* of connector case 5*a*, tapered portions 11*h*' gradually cut into regions 61, 62, indicated by broken lines, of insulation 6*a*' of external wire 6*a*, so that contact 11 may be inserted in connector case 5*a* with comparatively less force than in known connectors.

Further, tapered projections 11*j* may be formed at both outer sides of first side plate 11*f*. Referring to FIG. 7(*b*), as each tip 11*f*' of first side plate 11*f* approaches a bottom surface 5*f*' of first groove 5*f* of connector case 5*a*, each tapered projection 11*j* contacts side walls 5*f*' of first groove 5*f*. The engagement of side walls 5*f*" and tapered projections 11*j* deforms first side plate 11*f* of contact 11, so that a space Z between each tip 11*f*' of first side plate 11*f* decreases. As a result, a width of an entrance of narrow portion 11*i*, i.e., a distance between lateral edges 11*i*' of narrow portion 11*i* is reduced when first side plate 11*f* is inserted into groove 5*f*, so that core wire 6*a*" may be retained securely within narrow portion 11*i* of slit 11*g*. In this way, a secure electrical connection may be maintained between core wire 6*a*" of external wire 6*a* and lateral edges 11*i*' of narrow portion 11*i* of slit 11*g* of contact 11.

Figure 8:
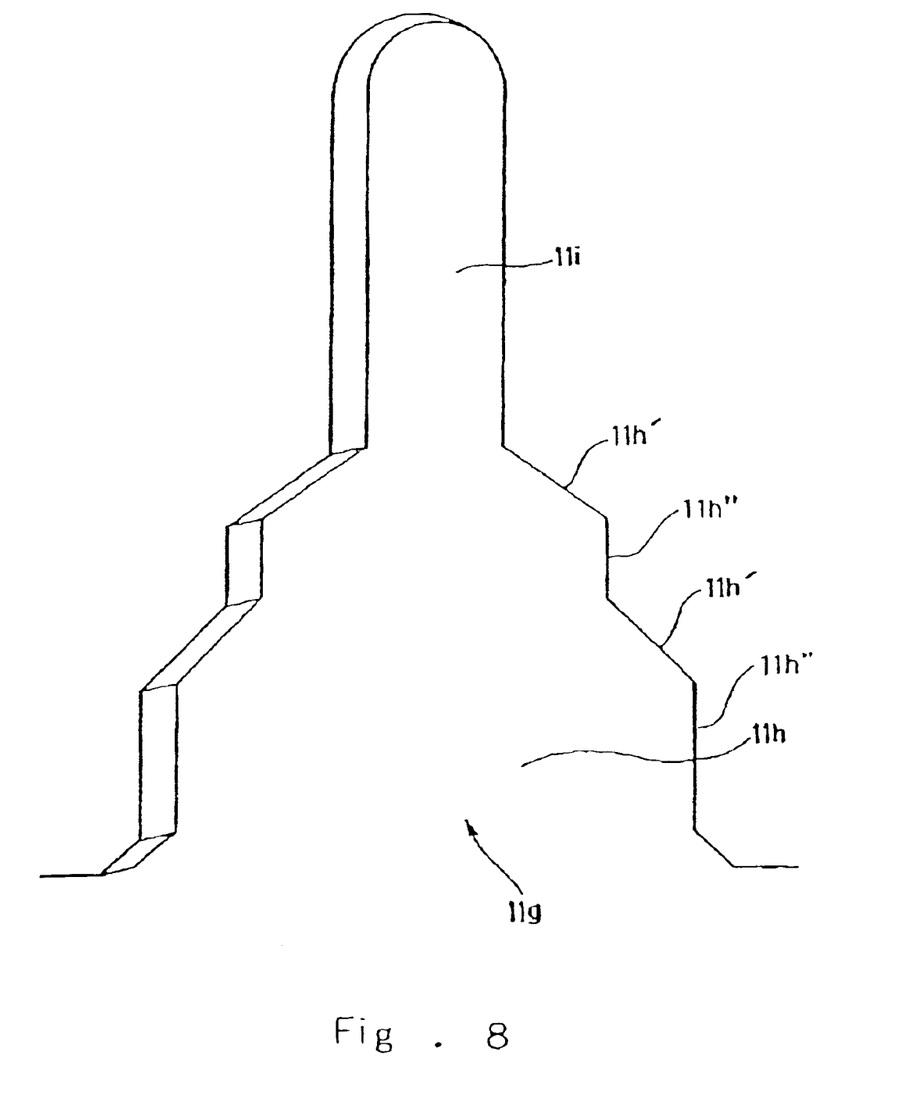
FIG. 8 is a perspective view of a slit for receiving an external wire in a contact according to an embodiment of the present invention.

According to another embodiment of the invention, a width of wide portion 11*h* of slit 11*g* may decrease in a stepwise manner as wide portion 11*h* extends toward narrow portion 11*i*, as shown in FIG. 8. Wide portion 11*h* may include a plurality of tapered portions 11*h*' and a plurality of vertical portions 11*h*", each of which vertical portions 11*h*" extends in a direction that is substantially parallel to that of narrow portion 11*i*. Tapered portions 11*h*' and vertical portions 11*h*" are positioned alternately along both sides of wide portion 11*h* of slit 11*g*, so that, as slit 11*g* extends inwardly from an outer edge of first side plate 11*f*, a width of wide portion 11*h* of slit 11*g* decreases in a stepwise manner. Thus, when contact 11 is pushed into case 5*a*, tapered portions 11*h*' gradually and stepwisely cut into insulation 6*a*' of external wire 6*a*. Accordingly, each tapered portion 11*h*' may progressively cut into and through insulation 6*a*' of external wire 6*a*.

Figure 9:
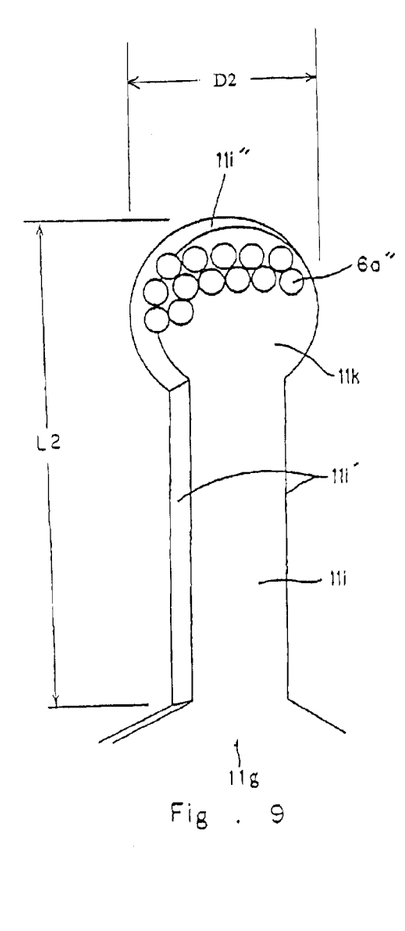
FIG. 9 is a perspective view of a slit for receiving an external wire in a contact according to an embodiment of the present invention.

According to a further embodiment of the invention, narrow portion 11*i* of slit 11*g* may include a curved, substantially semicircular end portion 11*i*'" having a diameter D2 that is greater than a width of narrow portion 11*i*, e.g., greater than a distance between lateral edges 11*i*' of narrow portion 11*i*, as shown in FIG. 9. End portion 11*i*'" may form a rounded, extended space 11*k* in first side plate 11*f* at an end of narrow portion 11*i* of slit 11*g* that is opposite to an opening of slit 11*g*. When core wire 6*a*" is inserted into rounded, extended space 11*k*, core wire 6*a*" may expand, e.g., individual wires of core wire 6*a*" may separate or spread apart. The expansion of the core wire 6*a*" within rounded, extended space 11*k* may retain core wire 6*a*" within rounded, extended space 11*k* of narrow portion 11*i*. According to this embodiment of the invention, a depth L2 of narrow portion 11*i* of slit 11*g* may be reduced compared to known connectors.

Figure 10:
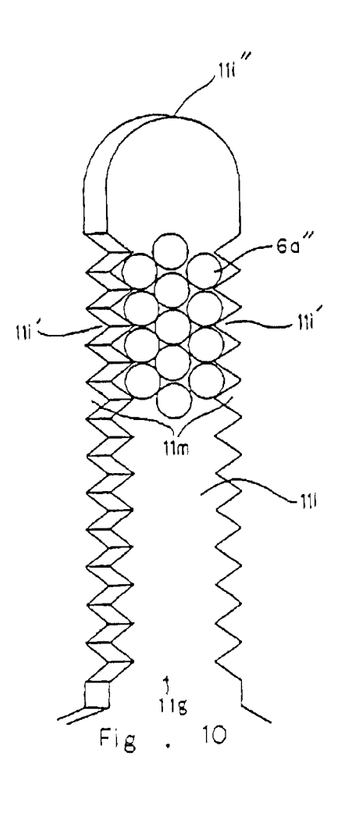
FIG. 10 is a perspective view of a slit for receiving an external wire in a contact according to an embodiment of the present invention.

In yet another embodiment of the invention, a plurality of saw teeth 11*m* may be formed on both lateral edges 11*i*' of narrow portion 11*i*, as shown in FIG. 10. When core wire 6*a*" enters narrow portion 11*i* in this embodiment of the invention, individual wires of core wire 6*a*" may contact one or more saw teeth 11*m*, so that a contact area between core wire 6*a*" and narrow portion 11*i* may be increased compared to known connectors. In this way, an electrical connection between core wire 6*a*" and contact 11 may be improved compared to known connectors.

Figure 11:
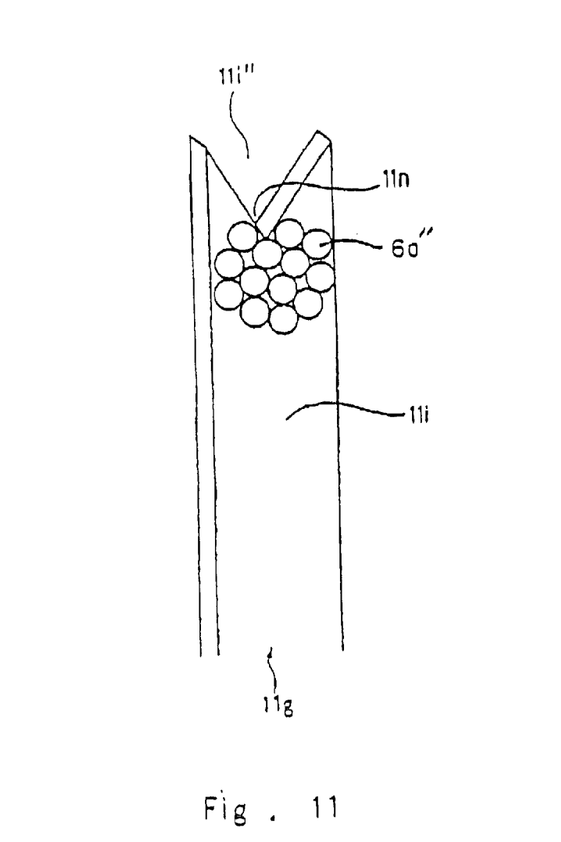
FIG. 11 is a perspective view of a slit for receiving an external wire in a contact according to an embodiment of the present invention.

In a still further embodiment of the invention, end portion 11*i*'" of narrow portion 11*i* of slit 11*g* may include a tooth 11*n*, as shown in FIG. 11. Tooth 11*n* may be formed at end portion 11*i*'" of narrow portion 11*i* and extend away from end portion 11*i*'" and toward an opening of slit 11*g*. When core wire 6*a*" enters narrow portion 11*i* in this embodiment of the invention, tooth 11*n* in may extend into core wire 6*a*", e.g., tooth 11*n* in may extend into and contact individual wires of core wire 6*a*", so that a contact area between core wire 6*a*"

and narrow portion 11$i$ may be increased compared to known connectors. In this way, an electrical connection between core wire 6$a$" and contact 11 may be improved compared to known connectors.

Figure 12:
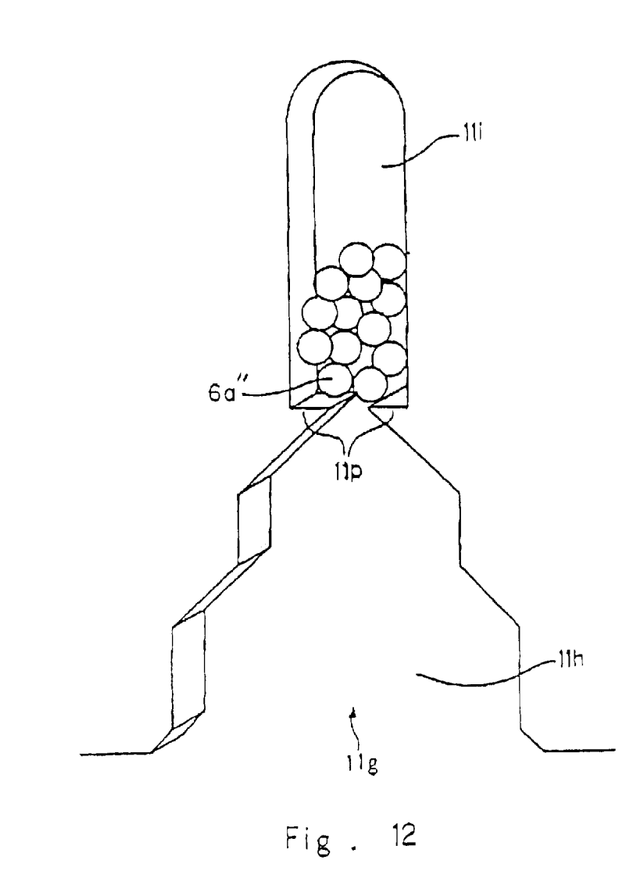
FIG. 12 is a perspective view of a slit for receiving an external wire in a contact according to an embodiment of the present invention.

In an additional embodiment of the invention, narrow portion 11$i$ of slit 11$g$ may include a pair of projections 11$p$, as shown in FIG. 12. Projections 11$p$ may be positioned at an entrance of narrow portion 11$i$, e.g., at a position of narrow portion 11$i$ adjacent to wide portion 11$h$. Projections 11$p$ may extend inwardly, e.g., toward one another, so that a width of narrow portion 11$i$ is reduced at projections 11$p$. After core wire 6$a$" enters narrow portion 11$i$, projections 11$p$ cooperate to retain core wire 6$a$" within narrow portion 11$i$ of slit 11$g$. In this way, an electrical connection between the core wire 6$a$" and contact 11 may be maintained.

Thus, contact 11 according to the present invention, may include three pairs of slits 11$d$, 11$e$, 11$g$. Contact 11 may be positioned in a connector, e.g., a connector case 5$a$, in alignment with three wires, each of which wires may be inserted simultaneously into one of the three pairs of slits when contact 11 is inserted into connector. Thus, an electrical connection may be formed between an end portion 2$a$, 2$b$ of coil 2, a lead wire 12$a$, 12$b$ of diode 12, and an external wire 6$a$, 6$b$, via contact 11, by placing end portion 2$a$, 2$b$ of coil 2, lead wire 12$a$, 12$b$ of diode 12, and end portion of external wire 6$a$, 6$b$ in connector case 5$a$ and by pressing contact 11 into connector case 5$a$ and onto each wire, so that each wire is engaged by a respective pair of slits 11$d$, 11$e$, 11$g$ of contact 11.

By the present invention, the step of removing insulation from an end portion of an external wire may be omitted. By the present invention, the step of crimping the exposed external wire in a contact may be omitted. Moreover, by the present invention, each of the external wire, the lead wire of a diode, and the end portion of the coil may be connected by inserting a contact into a connector case.

Moreover, the connector of the present invention securely maintains the electrical connection formed between the contact, the external wires, the end portions of the coil, and the lead wires of the diode, via an improved design of one or more slits of the contact. For example, the width of an entrance of each slit may narrow progressively as the slit extends away from a slit opening, so that the external wire may inserted more easily into each slit and so that the slit may cut through insulation of the external wire more easily than in known electrical connectors.

According to the present invention, the contact area between the core wire of the external wire and the contact may be increased, so that a secure electrical contact may be established and maintained therebetween. Moreover, the connector of the present invention may include a contact with a slit configured to retain the core wire within the slit of the contact after the core wire is inserted into the slit, so that the core wire may not escape from the slit, as may occur in known connectors.

Although the present invention has been described in detail in connection with preferred embodiments, the invention is not limited thereto. It will be understood by those skilled in the art that variations and modifications may be made within the scope of this invention, as defined by the following claims.

What is claimed is:

1. A yoke of an electromagnetic clutch comprising:
a ring case comprising an annular groove and an opening;
a coil assembly positioned in said annular groove of said ring case;
a connector comprising a first groove adapted to receive an end portion of said coil assembly, a second groove adapted to receive a lead wire of a diode, and a third groove adapted to receive an end portion of an external wire, wherein said connector is positioned in said opening of said ring case; and
at least one contact comprising three pairs of slits, wherein said at least one contact may be inserted in said connector so that each of said three pairs of slits is aligned with a respective one of said first groove, said second groove, and said third groove, so that said at least one contact forms an electrical connection between said end portion of said coil assembly, said lead wire of said diode, and said end portion of said external wire.

2. The yoke of claim 1, wherein an axis of said first groove is substantially perpendicular to an axis of said third groove.

3. The yoke of claim 1, wherein said contact further comprises an upper plate, a pair of first plates extending from a first pair of opposing sides of said upper plate, and a pair of second plates extending from a second pair of opposing sides of said upper plate and wherein each of said first plates comprises a first slit of said three pairs of slits and each of said second plates comprises a second slit and a third slit of said three pairs of slits.

4. The yoke of claim 3, wherein said second slit is aligned with said first groove to engage said end portion of said coil assembly, wherein said third slit is aligned with said second groove to engage said lead wire of said diode, and wherein said first slit is aligned with said third groove to engage said end portion of said external wire, so that said contact forms an electrical connection between said end portion of said coil assembly, said lead wire of said diode, and said end portion of said external wire.

5. The yoke of claim 3, wherein each of said first plates includes a pair of projections positioned at side edges of said first plate.

6. The yoke of claim 3, wherein said first slit comprises a wide portion, a narrow portion, and a tapered portion connecting said wide portion and said narrow portion.

7. The yoke of claim 6, wherein a width and a depth of said wide portion and a depth of said narrow portion are greater than an outer diameter of said external wires, and a width of said narrow portion is less than a diameter of core wires of said external wires.

8. The yoke of claim 6, wherein said wide portion comprises a plurality of tapered portions and a plurality of vertical portions.

9. The yoke of claim 6, wherein an end portion of said narrow portion includes a rounded edge.

10. The yoke of claim 6, wherein said narrow portion includes two lateral edges and wherein each of said lateral edges includes a plurality of saw teeth.

11. The yoke of claim 6, wherein a tooth is formed at an end portion of said narrow portion and wherein said tooth extends away from said end portion.

12. The yoke of claim 6, wherein said narrow portion includes a pair of projections that extend toward each other.

13. The yoke of claim 3, wherein each of said second slit and said third slit comprise a wide portion, a narrow portion, and a tapered portion connecting said wide portion and said narrow portion.

14. A method of connecting a plurality of wires in a connector case of a yoke of an electromagnetic clutch, wherein said connector case comprises a first groove, a second groove, and a third groove, comprising the steps of:
positioning a first wire in said first groove;

positioning a second wire in said second groove;

positioning a third wire in said third groove;

positioning a contact in said connector case in alignment with each of said first, second, and third wires; and inserting said contact into said connector case, so that said contact engages said first, second and third wires.

15. The method of claim 14, wherein said contact comprises a first pair of slits, a second pair of slits, and a third pair of slits and wherein the step of positioning said contact in said connector case comprises the steps of:

positioning said first pair of slits in alignment with said first wire;

positioning said second pair of slits in alignment with said second wire; and positioning said third pair of slits in alignment with said third wire.

16. The method of claim 15, wherein the step of inserting said contact into said connector case to engage said first, second, and third wires comprises the steps of:

said first pair of slits engaging said first wire;

said second pair of slits engaging said second wire; and said third pair of slits engaging said third wire.

17. The method of claim 16, wherein the step said third pair of slits engaging said third wire comprises the step of:

said third pair of slits cutting through an insulation of said third wire.

18. The method of claim 17, wherein said third pair of slits comprises lateral edges and wherein the step of cutting through an insulation of said third wire comprises the step of:

said lateral edges cutting through said insulation of said third wire.

* * * * *